US009554397B2

(12) United States Patent
Cai et al.

(10) Patent No.: US 9,554,397 B2
(45) Date of Patent: Jan. 24, 2017

(54) IDENTIFYING A SUBFRAME CONTAINING INFORMATION RELATING TO AN UPLINK GRANT

(71) Applicant: BLACKBERRY LIMITED, Waterloo (CA)

(72) Inventors: Zhijun Cai, Herndon, VA (US); Chandra Sekhar Bontu, Ottawa (CA); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 91 days.

(21) Appl. No.: 14/269,372

(22) Filed: May 5, 2014

(65) Prior Publication Data

US 2015/0319774 A1 Nov. 5, 2015

(51) Int. Cl.
*H04W 4/00* (2009.01)
*H04W 72/14* (2009.01)
*H04W 76/02* (2009.01)
*H04W 16/32* (2009.01)
*H04W 36/00* (2009.01)

(52) U.S. Cl.
CPC ........... *H04W 72/14* (2013.01); *H04W 76/028* (2013.01); *H04W 16/32* (2013.01); *H04W 36/0072* (2013.01)

(58) Field of Classification Search
CPC .............................. H04W 72/14; H04W 36/00
See application file for complete search history.

(56) References Cited

U.S. PATENT DOCUMENTS

| 6,400,951 | B1 * | 6/2002 | Vaara | H04W 48/16 455/436 |
| 9,008,040 | B2 * | 4/2015 | Song | H04W 36/0077 370/331 |
| 2007/0293224 | A1 * | 12/2007 | Wang | H04W 36/0055 455/436 |
| 2008/0268849 | A1 * | 10/2008 | Narasimha | H04W 36/0077 455/437 |
| 2009/0239570 | A1 * | 9/2009 | Koyanagi | H04W 36/0077 455/525 |
| 2009/0247203 | A1 * | 10/2009 | Kuo | H04W 76/048 455/509 |
| 2010/0091739 | A1 * | 4/2010 | Dayal | H04L 1/0026 370/332 |
| 2010/0240359 | A1 * | 9/2010 | Wu | H04W 24/00 455/424 |
| 2011/0026449 | A1 * | 2/2011 | Kuo | H04L 5/0053 370/311 |

(Continued)

FOREIGN PATENT DOCUMENTS

WO 2012134178 10/2012

OTHER PUBLICATIONS

3GPP TS 36.211 V12.1.0 Technical Specification—3rd Generation Partnership Project; Technical Specification Group Radio Access Network; Evolved Universal Terrestrial Radio Access (E-UTRA); Physical channels and modulation (Release 12) (Mar. 2014) (120 pages).

(Continued)

*Primary Examiner* — Kevin Mew
(74) *Attorney, Agent, or Firm* — Trop Pruner & Hu, P.C.

(57) ABSTRACT

A user equipment (UE) receives a message identifying a subframe containing information relating to an uplink grant to be sent by a target cell.

21 Claims, 6 Drawing Sheets

(56) References Cited

U.S. PATENT DOCUMENTS

| | | | | |
|---|---|---|---|---|
| 2011/0134887 | A1* | 6/2011 | Jeon | H04W 36/0077 370/331 |
| 2011/0292909 | A1* | 12/2011 | Chin | H04W 36/0077 370/331 |
| 2011/0317670 | A1* | 12/2011 | Zhang | H04L 1/1822 370/336 |
| 2012/0002643 | A1* | 1/2012 | Chung | H04J 11/0093 370/331 |
| 2012/0093128 | A1* | 4/2012 | Song | H04W 36/0077 370/331 |
| 2012/0140733 | A1* | 6/2012 | Jung | H04W 36/0077 370/331 |
| 2012/0314569 | A1* | 12/2012 | Liu | H04W 36/0094 370/230 |
| 2013/0028223 | A1* | 1/2013 | Kim | H04L 5/0007 370/329 |
| 2013/0083666 | A1* | 4/2013 | Gaal | H04L 5/0053 370/241 |
| 2013/0083753 | A1* | 4/2013 | Lee | H04W 72/0453 370/329 |
| 2013/0265987 | A1* | 10/2013 | Ramachandran | H04W 36/0033 370/331 |
| 2013/0272187 | A1* | 10/2013 | Malladi | H04W 76/02 370/315 |
| 2013/0279465 | A1* | 10/2013 | Timner | H04W 74/006 370/329 |
| 2013/0343297 | A1* | 12/2013 | Dinan | H04W 72/042 370/329 |
| 2014/0022981 | A1* | 1/2014 | Kim | H04W 36/0055 370/315 |
| 2014/0087729 | A1* | 3/2014 | Olofsson | H04W 36/0083 455/436 |
| 2014/0220974 | A1* | 8/2014 | Hsu | H04W 36/0088 455/436 |
| 2014/0293883 | A1 | 10/2014 | Wang | |
| 2015/0105084 | A1* | 4/2015 | Bontu | H04W 36/0072 455/437 |

OTHER PUBLICATIONS

3GPP TS 36.300 V12.1.0 Technical Specification—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12) (Mar. 2014) (209 pages).

3GPP TS 36.321 V12.1.0 Technical Specification—3rd Generation Partnership Project; Technical Specification Group Radio Access Network; Evolved Universal Terrestrial Radio Access (E-UTRA); Medium Access Control (MAC) protocol specification (Release 12) (Mar. 2014) (57 pages).

3GPP TS 36.331 V12.1.0 Technical Specification—3rd Generation Partnership Project; Technical Specification Group Radio Access Network; Evolved Universal Terrestrial Radio Access (E-UTRA); Radio Resource Control (RRC); Protocol specification (Release 12) (Mar. 2014) (356 pages).

3GPP TS 36.355 V12.1.0 Technical Specification—3rd Generation Partnership Project; Technical Specification Group Radio Access Network; Evolved Universal Terrestrial Radio Access (E-UTRA); LTE Positioning Protocol (LPP) (Release 12) (Mar. 2014) (126 pages).

3GPP TS 36.423 V12.1.0 Technical Specification—3rd Generation Partnership Project; Technical Specification Group Radio Access Network; Evolved Universal Terrestrial Radio Access Network (E-UTRAN); X2 application protocol (X2AP) (Release 12) (Mar. 2014) (144 pages).

Yiping Wang et al., U.S. Appl. No. 14/037,868 entitled Discontinuous Reception Configuration filed Sep. 26, 2013 (50 pages).

European Patent Office, Extended European Search Report for EP15164750.0 dated Sep. 18, 2015 (7 pages).

* cited by examiner

IDENTIFYING A SUBFRAME CONTAINING INFORMATION RELATING TO AN UPLINK GRANT

BACKGROUND

As the demand for wireless data communication using wireless user equipments (UEs) has increased, wireless access service providers are increasingly facing challenges in meeting capacity demands in regions where the density of users is relatively high. To address capacity issues, deployment of small cells has been proposed. A small cell (or multiple small cells) can operate within a coverage area of a larger cell, referred to as a macro cell. A small cell has a coverage area that is smaller than the coverage area of the macro cell. A small cell (or multiple small cells) can also operate outside the coverage area of the macro cell or overlap with the coverage area of a large cell.

BRIEF DESCRIPTION OF THE DRAWINGS

Some implementations are described with respect to the following figures.

DETAILED DESCRIPTION

Various types of small cells can be deployed in a mobile communications network. For example, a small cell can be a cell to which data communications of UEs can be offloaded from a macro cell. As other examples, small cells can include pico cells, femto cells, and coverage areas of relay nodes. A pico cell refers to a cell that has a relatively small coverage area, such as within a building, a train station, an airport, an aircraft, or other small area. A femto cell is a cell that is designed for use in a home or small business. A femto cell is associated with a closed subscriber group (CSG), which specifies that only users within the specified group are allowed to access the femto cell. A relay node is used for wirelessly relating data from one wireless entity to another wireless entity.

Figure 1:
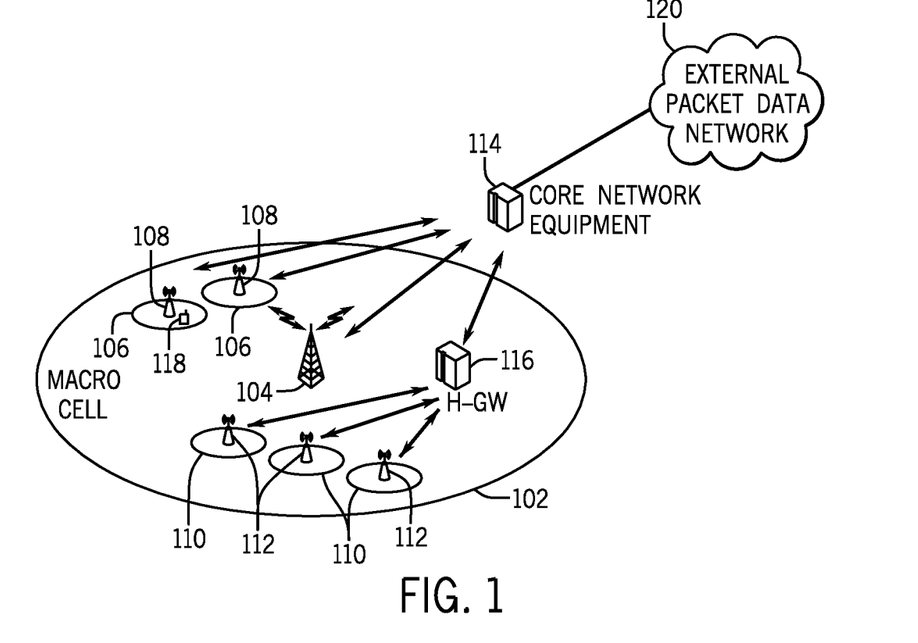
FIG. 1 is a schematic diagram of an example network arrangement that includes a cluster of small cells in a macro cell, according to some implementations.

Generally, small cells employ wireless access network nodes that consume less power than a wireless access network node of a macro cell. A wireless access network node communicates wireless signaling with user equipments (UEs) within the coverage area of the wireless access network node. Examples of UEs can include any or some combination of the following: smartphones, personal digital assistants, notebook computers, tablet computers, game appliances, or any other devices capable of performing wireless communications FIG. 1 is a schematic diagram of an example arrangement that includes a macro cell 102 served by a macro wireless access network node 104. A macro cell has a coverage area provided by the macro wireless access network node 104. A macro cell has a coverage area that is generally larger than the coverage area of a small cell provided by a small cell wireless access network node. For example, in FIG. 1, small cells 106 and 110 are depicted, where each small cell 106 is served by a respective small cell wireless access network node 108, and each small cell 110 is served by a respective small cell wireless access network node 112.

The small cells 106 and 110 differ in that the small cell wireless access network nodes 108 of the small cells are coupled over links directly to core network equipment 114, while the small cell wireless access network nodes 112 of the small cells 110 are connected to an intermediate gateway, such as a home gateway 116, which in turn is connected to the core network equipment 114. The core network equipment 114 can include a control node and one or more data gateways. The data gateway(s) can be coupled to an external packet data network (PDN) 120, such as the Internet, a local area network (LAN), a wide area network (WAN), and so forth.

Links between a wireless access network node and the core network equipment 114 can be referred to as a backhaul link, which can represent a logical communication link between two nodes; the backhaul link can either be a direct point-to-point link or can be routed through another communication network or node. In some examples, a backhaul link is a wired link. In other examples, a backhaul link is a wireless link.

In some examples, the small cells 110 can be femto cells, and the small cell wireless access network nodes 112 can be femto wireless access network nodes. In other examples, the small cells 110 can be other types of cells. The small cells 106 can be pico cells, coverage areas of relay nodes, or small cells to which data communications of the macro cell 102 can be offloaded. Although FIG. 1 shows different types of small cells, including the small cells 106 and the femto cells 110, it is noted that in alternative examples, just one type of small cells can be included in the macro cell 102.

FIG. 1 also shows a UE 118, which can move around within the macro cell 102, and between macro cells. Although just one macro cell 102 is shown in FIG. 1, it is noted that in alternative examples, multiple macro cells 102 are provided. Also, although just one UE 118 is shown in FIG. 1, it is noted that in other examples, multiple UEs are present in the macro cell 102.

In the example of FIG. 1, the UE 118 is currently in the coverage area of one of the small cells 106. A wireless UE 110 within the coverage area of a small cell (106 or 110) is able to wirelessly communicate with the respective small cell wireless access network node (108 or 112). The UE 110 is also able to wirelessly communicate with the macro wireless access network node 104.

When the UE 118 moves, the UE can traverse across multiple small cells, including small cells 106 and 110. When the UE 118 crosses between different small cells (106, 110), handover can be performed, where the UE 118 is handed over from being served by a serving wireless access network node in a serving small cell to a target wireless access network node. A serving wireless access network node of a UE refers to a wireless access network node whose associated cell is actively communicating with the UE. A target wireless access network node is a wireless access network node whose associated cell is determined to be a better serving cell for further data and control transactions of the UE. Handing over the UE from the source wireless access network node to the target wireless access network node involves switching the data and/or control paths of the UE from the serving wireless access network node to the target wireless access network node when the UE indicates its successful association with the target cell.

If the UE 118 traverses across multiple small cells, then multiple handovers may be performed. Since the coverage area of each small cell is relatively small, the number of handovers that can occur as a result of movement of the UE can be relatively high.

Although reference is made to handover between small cells in some examples, it is noted that techniques or mechanisms according to some implementations are also applicable to handovers between a small cell and a macro cell, or between macro cells.

During a handover, a failure may occur that may prevent a successful handover. For example, one such failure is a radio link failure (RLF), which is a failure due to a radio connection between the UE 118 and a wireless access network node becoming of such low quality that the radio connection is lost. Due to RLF, the UE would traditionally have to re-establish a radio connection, which can take a relatively long time, such as hundreds of milliseconds. Radio connection re-establishment refers to a procedure to establish a radio connection after a previously established radio connection has been lost. A radio connection includes various resources (e.g. time slots, carrier frequencies, etc.) that can be used by a UE to communicate data or control information. As a result of RLF during handover, data communications of the UE 118 can be interrupted, or a voice call may be dropped.

In accordance with some implementations, techniques or mechanisms are provided to reduce the interruption time due to an RLF during handover of a UE between cells, such as small cells. More generally, the interruption time of communications of a UE can be reduced during re-establishment of a radio connection re-establishment by using procedures or mechanisms according to some implementations. Radio connection re-establishment can be performed by a UE for various purposes, such as in response to RLF during handover, or in response to other causes.

In some implementations, time synchronization can be provided between the various wireless access network nodes, including between the macro wireless access network node 104 and each of the wireless access network nodes 108 and 110.

In accordance with some implementations, to allow for reduced interruption time when performing radio connection re-establishment, such as due to an RLF during handover, specified information can be sent to a UE such that the UE can use the specified information to more quickly perform radio connection re-establishment. Traditionally, if RLF occurs during a handover, the UE attempts to synchronize with a selected wireless access network node (such as the target wireless access network node to which the UE is to be handed over), and to access the selected wireless access network node using a random access procedure. Using a random access procedure to access the selected wireless access network node is time consuming and can result in a relatively long interruption time when performing radio connection re-establishment.

In some examples, the specified information that can be sent to a UE to allow the UE to more quickly perform radio connection re-establishment includes information that identifies one or multiple downlink subframes containing information relating to an uplink grant (or multiple uplink grants) that is to be sent by a target cell. The specified information informs the UE beforehand (before occurrence of a handover) certain parameters that pertain to a potential target cell (or potential target cells). Also, the specified information can include a subframe (or a range of subframes) that is used by the target cell for sending information relating to uplink grant(s) to the UE. If radio connection re-establishment has to occur, the UE can use the specified information to detect an uplink grant (or uplink grants) in the specified downlink subframe (or subframes) sent by the target cell.

An uplink grant identifies uplink resources that can be used by the UE to perform communications of data and/or control information. Upon detection of an uplink grant in a downlink subframe specified by the specified information, the UE can employ resources indicated by the uplink grant to transmit a message to the target cell to perform the radio connection re-establishment without triggering a complete random access procedure. In this way, the radio connection re-establishment, which can be triggered due to RLF during a handover, for example, can be performed more quickly. Further, by avoiding the random access procedure, the generated interference may also be much reduced.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node (e.g. 104 in FIG. 1) is referred to as a macro eNB, while a small cell wireless access network node (e.g. 108 or 112) is referred to as a small cell eNB.

In an E-UTRA network, the control node in the core network equipment 114 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) of the core network equipment 114 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 120. The PDN-GW is the entry and egress point for data communicated between a UE in the E-UTRA network and a network element coupled to the PDN 120. There can be multiple PDNs and corresponding PDN-GWs. Moreover, there can be multiple MMEs and SGWs.

Figure 2:
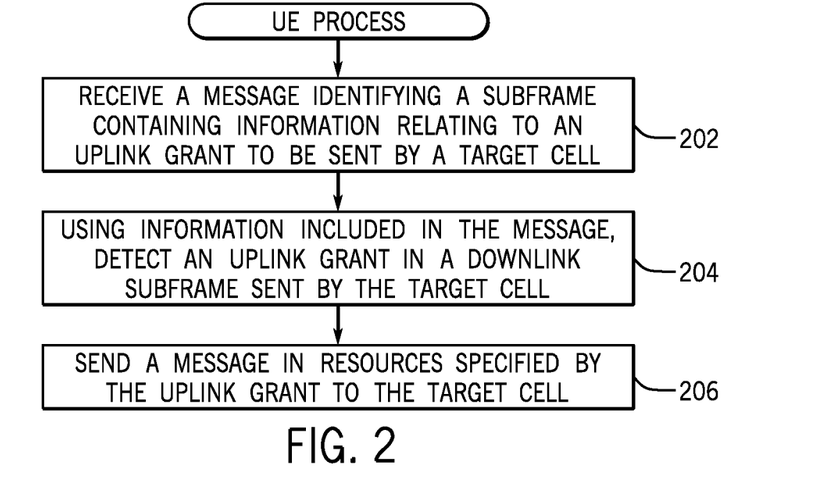
FIG. 2 is a flow diagram of a process of a user equipment (UE) according to some implementations.

FIG. 2 is a flow diagram of a process according to some implementations, which can be performed by a UE (e.g. 118 in FIG. 1). The UE receives (at 202) a message identifying a subframe (or multiple subframes) containing information relating to an uplink grant (or uplink grants) to be sent by a target cell (or more specifically, by a wireless access network node of the target cell). Identifying multiple downlink subframes that contain information relating to uplink grants can be performed since it is uncertain when a UE will actually arrive at the target cell during a handover. As a result, the UE is given more opportunities to detect an uplink grant by monitoring any of the identified downlink subframes. Using multiple subframes can improve reliability. Further, providing multiple subframes may not lead to waste of resources, since when after the UE transmits an uplink message to the target cell using the uplink grant received in a certain downlink subframe, the target cell will not provide further grants in other downlink subframes. The serving cell can request multiple uplink grants from the target cell in specific subframes of the target cell. The target cell could override the pre-allocations of multiple subframes if resources are constrained in the target cell.

Using the information included in the message, the UE detects (at 204) the uplink grant in a downlink subframe (identified in the message) sent by the target cell. Note that the UE can also detect multiple uplink grants in respective identified subframes.

The UE then sends (at 206) a message (in resources specified by the detected uplink grant) to the target cell to complete a handover from a source cell to the target cell, in response to the UE successfully accessing the target cell or detecting the information relating to the uplink grant. In some examples, the message sent at 206 can be a Radio Resource Control (RRC) Connection Reestablishment message (which can also be referred to as an RRC Connection Reconfiguration Complete message). According to E-UTRA, a radio connection established between a UE and an eNB is referred to as an RRC connection. Each of the UE and eNB includes an RRC entity for establishing an RRC connection. RRC is described further in 3GPP TS 36.331, in some examples. Although reference is made to an RRC connection as an example of a radio connection, it is noted that in other examples, other types of radio connections can be established between a UE and a wireless access network node.

The RRC Connection Reestablishment message is sent by the UE to the target cell to confirm a handover from the source cell to the target cell. In response to the RRC Connection Reestablishment message, the eNB of the target cell retrieves the UE context (containing various information associated with the UE) and establishes the RRC connection with the UE.

Figure 3:
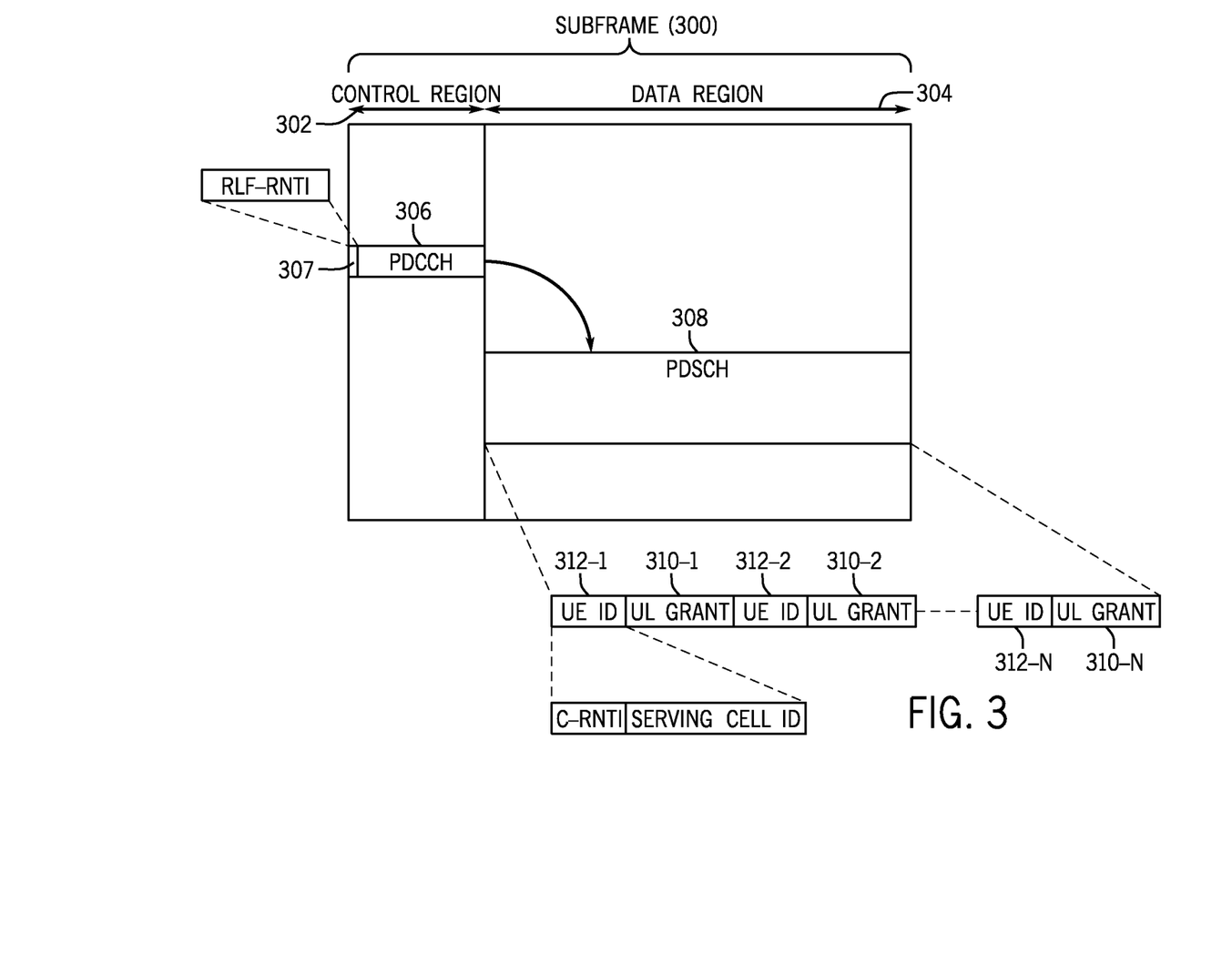
FIG. 3 is a schematic diagram of an example subframe according to some implementations.

An example of a downlink subframe 300 according to some implementations that can include an uplink grant is shown in FIG. 3. The subframe 300 includes a control region 302 (for carrying control information) and a data region 304 (for carrying data). The downlink subframe 300 can be a subframe identified in the message received at 202 in FIG. 2.

In the example of FIG. 3, the control region 302 of the subframe 300 can carry a Physical Downlink Control Channel (PDCCH) 306, which carries downlink control signaling transmitted by an eNB to a UE. In the example of FIG. 3, the PDCCH 306 can include a pointer (or other information) identifying a location in the data region 304 that contains one or multiple uplink grants. The identified location in the data region 304 can include a Physical Downlink Shared Channel (PDSCH) 306, which carries downlink data sent by an eNB to a UE.

To allow the UE to find the portion of the control region 302 (or more generally, the portion of the subframe 300) that contains information referring to an uplink grant (or uplink grants), a special indicator 307 can be provided. In the example of FIG. 3, this special indicator 307 is part of the PDCCH 306. In other examples, the special indicator 307 can be in another part of the subframe 300.

In some implementations, the special indicator 307 includes a special Radio Network Temporary Identifier (RNTI), referred to as an RLF-RNTI in some examples. The presence of the special RNTI indicates that information referring to an uplink grant (or uplink grants) is present in the subframe 300. A UE can search for the special RNTI to find the information referring to an uplink grant (or uplink grants).

When the UE determines that radio connection re-establishment is to be performed, such as due to RLF during a handover, the UE may monitor downlink subframe(s) identified in the message received at 202 (FIG. 2) sent by the target cell, and may search for an RLF-RNTI in such downlink subframe(s). Once an RLF-RNTI (within a PDCCH) is found, the UE can listen to a corresponding PDSCH (pointed to by the PDCCH) containing the uplink grant(s). Resources specified by the uplink grant can be used by the UE to transmit an RRC Connection Reestablishment message.

In the example of FIG. 3, the pointer in the PDCCH may refer to the PDSCH 308 that includes multiple uplink grants (e.g. 310-1, 310-2, . . . 310-N in FIG. 3). One or more of the uplink grants 310-1, 310-2, . . . 310-N can be for a particular UE. Each uplink grant in the PDSCH 308 is preceded (or otherwise associated) with a respective UE ID (312-1, 312-2, . . . 312-N), which can be a temporary identity of the respective UE in a serving cell. In the example of FIG. 3, each UE ID 312-1, 312-2, . . . 312-N can include a cell RNTI (C-RNTI) and a serving cell ID. The C-RNTI is allocated by an eNB of a serving cell to a UE, and uniquely identifies the UE within the serving cell. The serving cell ID is an identifier of the serving cell (different cells have different serving cell IDs). In another alternative, serving cell ID may not be sent therefore the UE ID would include only the C-RNTI or other identifier of the UE.

A UE can identify its UL grant(s) in the PDSCH 308 by looking for its temporary identity within the PDSCH 308. By being able to listen for uplink grants in specific downlink subframes, a UE can perform radio connection re-establishment more quickly than if a random access procedure has to be performed. In this way, the interruption time due to RLF during a handover can be reduced.

Figure 4:
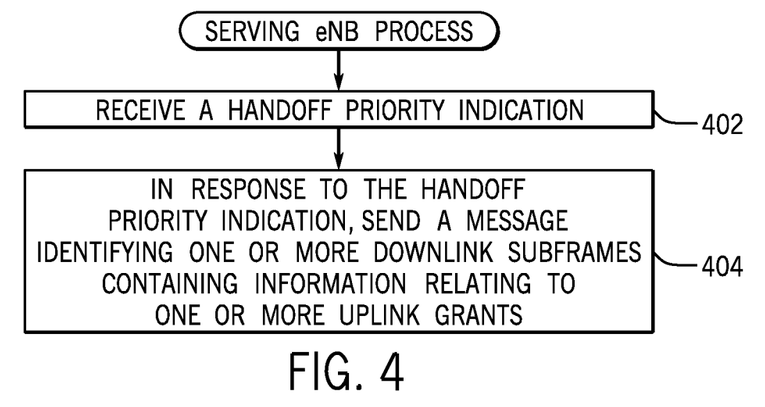
FIG. 4 is a flow diagram of a process of a source wireless access network node according to some implementations.

FIG. 4 is a flow diagram performed by a serving eNB, according to some examples. The serving eNB is the eNB that is currently serving a UE, prior to a handover to a target eNB of a target cell.

The serving eNB receives (at 402), from the UE, a handoff priority indication. The handoff priority indication is an indication sent by the UE to the source eNB to indicate that the UE is to receive a message (e.g. the message sent at 202 in FIG. 2) containing information identifying one or more downlink subframes that contain information relating to an uplink grant (or uplink grants) (in other words, the UE is to be provided handover priority). Note that not all UEs will send the handoff priority indication, just those UEs that have specific characteristics. For example, a UE is provided handover priority if signal quality measurements as a function of time indicate that the UE has a mobility greater than a specified threshold. In other examples, a UE is provided handover priority if the UE is engaged in time-sensitive communications (e.g. voice calls) or those UEs that have higher priority levels (e.g. those UEs with higher quality-of-service levels). Further example criteria are discussed below. In an alternative, the UE may indicate the handover priority during its call setup stage. In another alternative, the UE may indicate the handover priority together with its measurement report. The UE may also indicate the handover priority in response to a request from an eNB.

In response to the handoff priority indication, the serving eNB sends (at 404), to the UE, a message identifying one or more downlink subframes containing information relating to one or more uplink grants to be sent by a target cell. This message is the message received at 202 in FIG. 2 by the UE.

Figure 5:
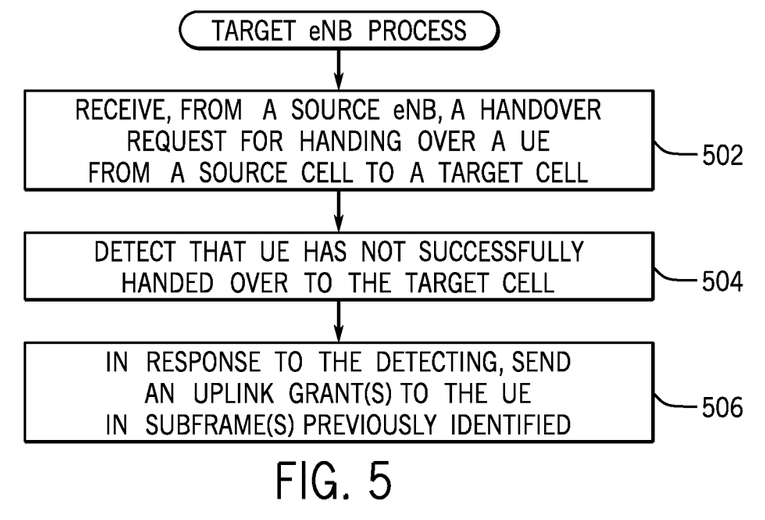
FIG. 5 is a flow diagram of a process of a target wireless access network node according to some implementations.

FIG. 5 is a flow diagram of a process of a target eNB, according to some examples. The target eNB receives (at 502), from a source eNB, a handover request for handing over a UE from a source cell to a target cell. The target eNB detects (at 504) that the UE has not successfully handed over to the target cell. In an alternative, the detecting can be based on an implementation specific timer or counter. In response to the detecting, the target eNB sends (at 506) an uplink grant (or multiple uplink grants) to the UE in a subframe (or multiple subframes) previously identified to the UE by the source eNB (in the message sent at 404 in FIG. 4, for example).

Figure 6:
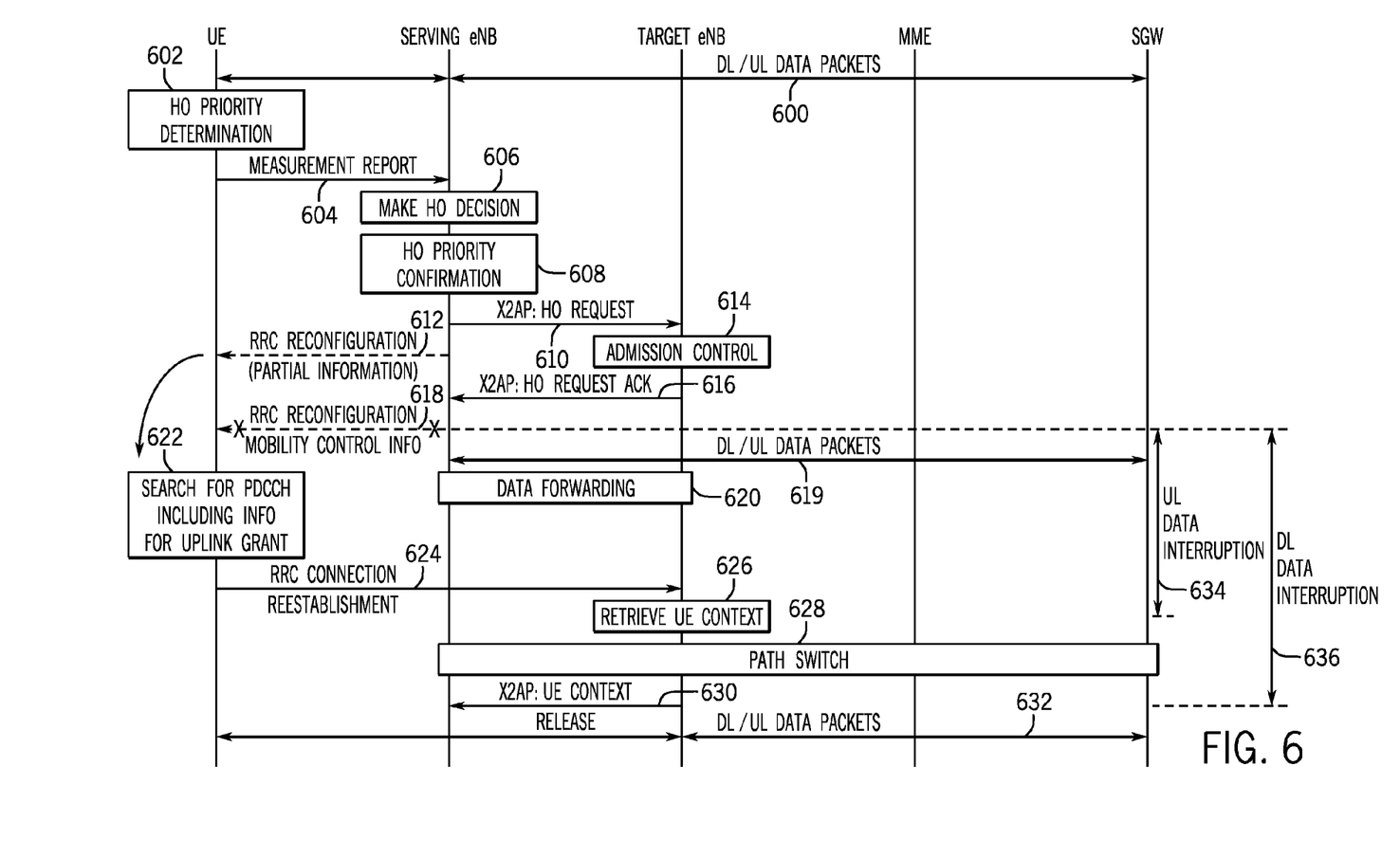
FIG. 6 is a message flow diagram of a process according to further implementations.

FIG. 6 is a message flow diagram of an example message flow diagram, which involves a UE, a serving eNB, a target eNB, an MME, and an SGW. Initially, while the UE is served by the serving eNB, uplink and downlink data packets are communicated (at 600) between the UE and the SGW in the core network equipment 114 (FIG. 1) through the serving eNB.

The UE performs (at 602) a handover priority determination, which determines whether the UE is to be given priority in case of radio connection re-establishment (e.g. RRC connection re-establishment) is to be performed due to RLF during a handover.

The UE is triggered to send (at 604) a measurement report according to rules that are set by in system information (sent by an eNB to UEs), by a standards specification, and so forth. The measurement report can include information indicating a quality of a radio link between a UE and each cell that is detectable by the UE. If the handover priority determination (602) indicates that the UE is to be given priority in case of radio connection re-establishment, the UE may include a handover priority indication (such as discussed in connection with FIG. 4) in the measurement report. In another alternative, the UE can indicate the handover priority in other uplink RRC messages or in response to a request from an eNB.

Based on the measurement report, the serving eNB makes (at 606) a handover decision. If the handover decision indicates that the UE is to be handed over from the serving (or source) eNB to another eNB, the serving eNB selects an appropriate target cell based on measurement report received from the UE to initiate a handover. The serving cell can further confirm (at 608) the handover priority of the UE, based on whether or not a handover priority indication is included in the measurement report by the UE.

The serving eNB next issues (at 610) an X2AP: Handover Request message to the target eNB. X2AP refers to a control plane protocol between eNBs over an X2 interface that links the eNBs. The Handover Request message contains information to prepare the handover at the target eNB to which the Handover Request message was sent. The Handover Request message can include a request for an uplink grant at the target cell for the incoming UE to send the RRC Connection Reestablishment message.

It is noted that in some examples the serving cell and the target cell are assumed to belong to different eNBs (in other words, an inter-eNB handover is performed).

If the handover priority confirmation (608) performed at the serving eNB confirms that the UE is to be provided handover priority, the serving eNB can send (at 612) a message (e.g. an RRC Reconfiguration message) that contains partial information of the target cell to the UE. The partial information may include one or more downlink subframe numbers (such as in the form of a Subframe Offset) (identifying respective one or more downlink subframes) containing an uplink grant (or uplink grants) that is (are) to be sent by the target cell. To accurately identify the subframes in the target cell, a subframe number in combination with a subframe index may be used.

The subframe numbers that the serving eNB provides to the UE can be preconfigured by the serving eNB. The serving eNB may not wait for the response to the Handover Request message from the target eNB but rather assumes the target eNB may transmit the uplink grants (to the UE's RLF-RNTI) in the corresponding downlink subframes.

Due to dynamic scheduling characteristics and the handover's higher priority, the target eNB can allocate the uplink grants in the corresponding subframes for the UE. It should be noted that the UE will only respond to one of these uplink grants after moving into the target cell (i.e. after RLF in the source cell). In the case that the resource is not available in one of these subframes, the target eNB may not provide the respective uplink grant. In this case, the UE does not receive any uplink grant from the target eNB (the possibility is relatively low due to the large resource pool for the uplink and the dynamic scheduling feature), in which case the UE can then follow the normal RLF recovery procedure and start a random access procedure after waiting a predetermined period of time for an uplink grant to the UE's RLF-RNTI. Since it is unclear when the UE will actually arrive in the target cell, multiple subframes may be pre-allocated to transmit the uplink grants. Since the number of UEs to be provided handoff priority may be relatively small, consumption of resources associated with sending uplink grants in multiple downlink subframes may not present an issue.

The target eNB performs (at 614) admission control, which can be dependent on the received quality-of-service (QoS) information of a radio access bearer. The admission control can increase the likelihood of a successful handover, if the resources can be granted by target eNB. The target eNB configures the resources according to the received QoS information and reserves a C-RNTI and optionally a random access channel (RACH) preamble.

The target eNB prepares an uplink grant for the incoming UE to send the RRC Connection Reestablishment message. After a certain duration (which can be implementation specific or can depend on an RLF timer, a handover delay timer, etc.) after receipt of the Handover Request message, if the UE does not successfully handover to the target cell, the target eNB starts to allocate the uplink resources corresponding to the subframes indicated by the serving eNB and transmits uplink grants in these subframes. If the UE successfully completes the handover, the target eNB would not have to perform the allocation of resources.

The target eNB prepares the handover and sends (at 616) an X2AP: Handover Request Acknowledge message to the serving eNB. The Handover Request Acknowledge message includes a transparent container to be sent to the UE as an RRC message to perform the handover. The container can include one or more of the following: a new C-RNTI, target eNB security algorithm identifiers for the selected security algorithms, a dedicated RACH preamble, and other information elements (e.g. access parameters, System Information Blocks, etc.). The Handover Request Acknowledge message may also include information for forwarding tunnels, in some examples. The Handover Request Acknowledge message can also identify a downlink subframe(s) in which an UL grant(s) is (are) expected at the target cell for the incoming UE to send the RRC Connection Reestablishment message.

The target eNB also generates the RRC message to perform the handover, e.g. the RRC Connection Reconfiguration message to be sent (at 618) by the serving eNB to the UE. The RRC Connection Reconfiguration message contains mobility control information. In some examples, the mobility control information can identify the downlink subframe(s) to be sent by the target cell to carry an uplink grant(s). In other examples, since information of the downlink subframe(s) has already been sent in the message at 612, then the information can be excluded from the information sent at 618.

The serving eNB attempts to transmit (at 618) the RRC Reconfiguration message to the UE. However, due to poor radio conditions, the UE may not receive the RRC Reconfiguration message. This causes an RLF.

Before handover completes, the serving eNB can continue to exchange (at 619) uplink and downlink data packets of the UE with the SGW in the core network equipment 114 (FIG. 1).

The serving eNB next starts transmitting (at 620) unacknowledged data packets to the target eNB; these data packets are to be sent by the target eNB to the UE.

After determining that an RLF has occurred, the UE may move to the target cell specified in the partial information included in the RRC Reconfiguration message sent by the serving eNB to the UE (at 612). Also, using the partial information, the UE can search (at 622) for PDCCH including information relating to an uplink grant, by searching for the RLF-RNTI in an identified downlink subframe (or multiple subframes) sent by the target eNB. The UE can derive target eNB specific keys and configure the selected security algorithms to be used in the target cell.

When the UE has successfully accessed the target cell or a pointer to the uplink grant is detected (based on finding an RLF-RNTI in an identified subframe), the UE sends (at 624) the RRC Connection Reestablishment message (containing the C-RNTI of the UE) to confirm the handover with the target eNB. The UE can also send an uplink Buffer Status Report, whenever possible, to the target eNB to indicate that the handover procedure is completed for the UE. The target eNB verifies the C-RNTI sent in the RRC Connection Reestablishment message.

The target eNB retrieves (at 626) the UE context of the UE, and establishes an RRC connection with the UE. The target eNB sends (at 628) an S1AP: Path Switch message to the MME in the core network equipment 114 (FIG. 1) to inform the MME that the UE has changed cells. S1AP provides a signaling service between an eNB and the MME.

The MME then sends an Update User Plane Request message to the SGW in the core network equipment 114. The SGW switches the downlink data path to the target cell. The SGW sends one or more "end marker" packets on the old path to the serving eNB and then can release any user plane resources towards the serving eNB. The SGW sends an Update User Plane Response message to the MME. The MME confirms the Path Switch message with a Path Switch Acknowledge message. The target eNB starts making the scheduling decisions on the new packets received from this point.

The target eNB then sends (at 630) an X2AP: UE Context Release message to the serving eNB to inform the serving eNB of successful handover. The target eNB sends this message after the S1AP: Path Switch Acknowledge message is received from the MME.

FIG. 6 shows an example of the uplink data interruption time (634) and the downlink data interruption time (636), which is reduced due to use of techniques or mechanisms according to some implementations.

Figure 7:
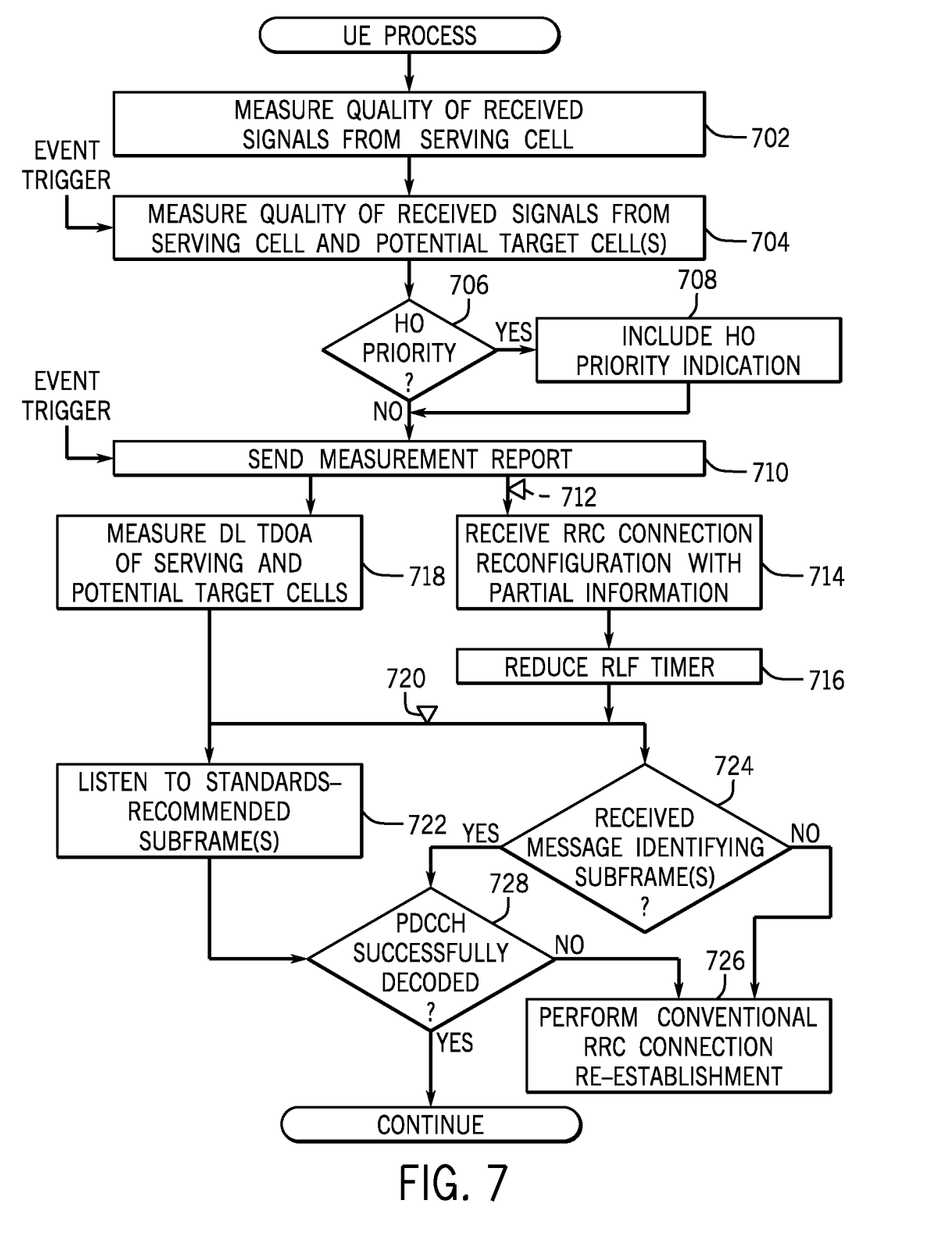
FIG. 7 is a flow diagram of a process of a UE according to further implementations.

FIG. 7 is a flow diagram of a process performed by a UE, according to some implementations. The UE measures (at 702) a quality of received signals from the serving cell. In response to an event triggering neighbor cell measurements, the UE measures (at 704) the quality of received signals from the serving cell and potential target cell(s).

The UE then determines (at 706) whether the UE is to have handover priority, such as based on the measurements at the serving cell. This determination can be implementation specific. For example, when the UE is moving from a pico cell to a macro cell, there may be high likelihood of RLF, so that the UE should set the handover priority. In another example, if the UE observes the signal strength of the serving cell deteriorates quickly or the UE observes its moving speed is high, the UE may set the handover priority. The triggering conditions can also be defined in the standards. This could involve one or more criteria such as signal strength, signal quality, RSRP, RSRQ, Ec/No, Ec/Io, block error rates, frame errors, and so forth. In an alternative, the trigger may be based on a combination of criteria, such as some combination of the foregoing factors satisfying some associated threshold.

The criteria to consider and respective thresholds can be network configurable, such as specified in a downlink message.

If the UE is to have handover priority, then the UE includes (at 708) the handover priority indication in a measurement report sent to the serving cell. In another alternative, the UE may indicate the handover priority in the call setup stage to the serving cell. If the UE is not to have handover priority, then the UE does not include the handover priority indication in a measurement report sent to the serving cell.

In response to an event triggering sending of a measurement report, the UE sends (at 710) the measurement report to the serving cell, where the measurement report includes information relating to the measurements of received signals from the serving cell and the neighboring cell(s).

If an RLF occurs at point 712 in FIG. 7, then the conventional RRC connection re-establishment procedure is followed.

The UE receives (at 714) an RRC Connection Reconfiguration message (e.g. sent at 612 in FIG. 6) which contains partial information, including identifier(s) of downlink subframe(s) containing information relating to uplink grant(s) to be sent by a target cell. The UE may reduce (at 716) an RLF timer to reduce the RLF recovery time.

The UE also measures (at 718) a downlink time difference of arrival (TDOA) between the serving cell and the potential target cell(s). Based upon the measured information, the UE can have a better estimation of the uplink transmission timing for the target cell. In a small cell scenario, since the small cells and the macro cell are likely synchronized, and the propagation delay is not significant in the small cells, a fairly accurate uplink timing estimation can be achieved using the DL TDOA measurements. The UE may deduce that the target cell is synchronized with respect to the serving cell based on a number of mechanisms. For example, synchronization may be assumed:

(1) the UE receives an RRC Connection Reconfiguration message with partial information (such as the message sent at 612 in FIG. 6), or (2) if Almost Blank Subframes are configured in the system (such as described according to 3GPP TS 36.311).

If the target cell is not synchronized with the serving cell, then the serving cell may ignore the handover priority request from the UE and proceed to perform conventional RLF recovery.

If an RLF occurs at point 720, then if standards define a recommended downlink subframe(s) in which a target cell is to transmit uplink grant(s), then the UE can listen (at 722) to such recommended downlink subframe(s) to detect uplink grant(s) from the target eNB. Task 722 is omitted if the standards do not define such recommended downlink subframe(s).

The UE also determines (at 724) whether the UE received a message (e.g. 612 in FIG. 6) that identifies subframe(s) that contain information relating to uplink grant(s). If not, then the conventional RRC connection re-establishment procedure is performed (at 726).

The UE determines (at 728) whether a PDCCH referring to uplink grant information is successfully decoded (such as due to finding an RLF-RNTI). If not, then the conventional RRC connection re-establishment procedure is performed (at 726). However, if the PDCCH is successfully decoded, then the UE can use the corresponding uplink grant to complete the handover to the target cell.

Figure 8:
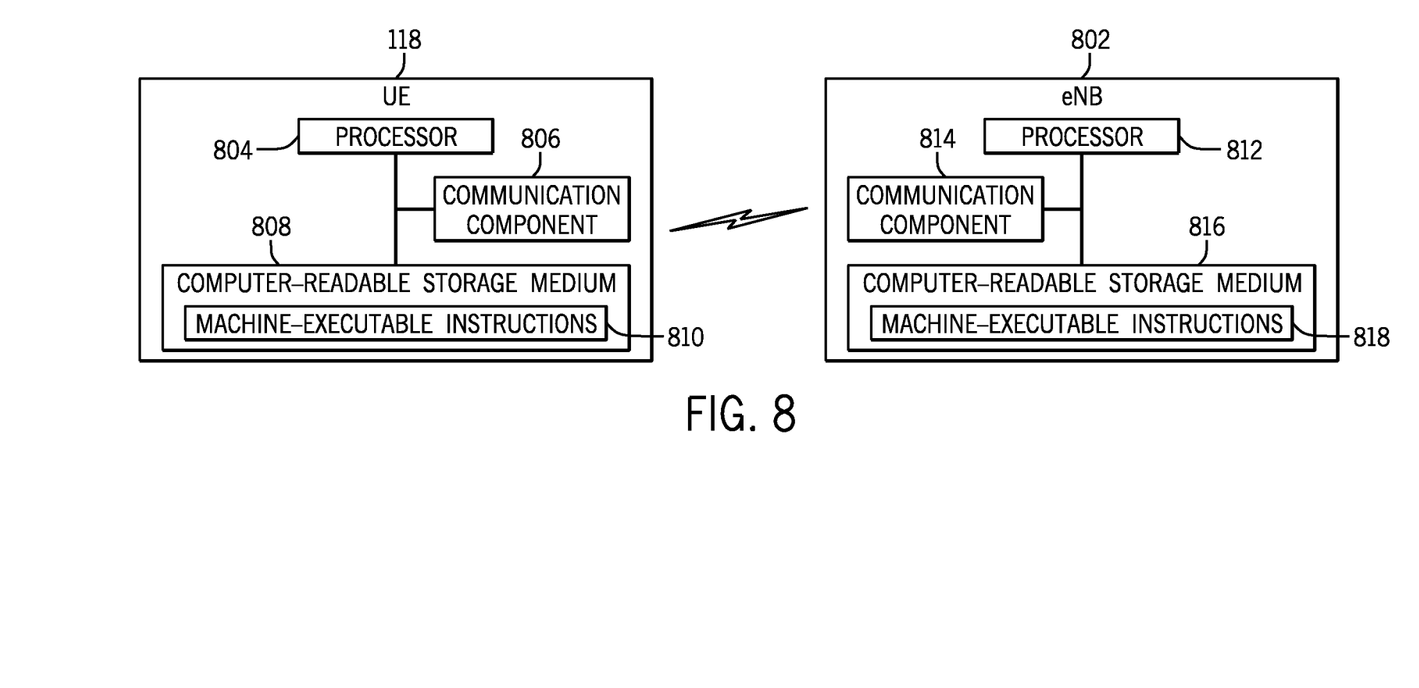
FIG. 8 is a block diagram of an example arrangement including a UE and a wireless access network node according to some implementations.

FIG. 8 is a block diagram of an example arrangement including the UE 118 and an eNB 802 (which can be a macro eNB, e.g. 104 in FIG. 1, or a small cell eNB, e.g. 108 or 112 in FIG. 1).

The UE 118 includes one or more processors 804. A processor can include a microprocessor, microcontroller, processor module or subsystem, programmable integrated circuit, programmable gate array, or another control or computing device. The processor(s) 804 can be coupled to a communication component 806 to allow the UE 118 to communicate over a network. The processor(s) 804 can be coupled to a non-transitory machine-readable storage medium (or storage media) 808, which can store machine-executable instructions 810 that are executable on the processor(s) 804.

The eNB 802 includes one or more processors 812, which can be coupled to a communication component 814 and a non-transitory machine-readable storage medium (or storage media) 816 that can store machine-executable instructions 818.

The machine-readable instructions 810 and 818 are executable to perform various tasks as discussed above.

The storage media 808 and 816 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The following provides examples of certain changes that can be made to 3GPP standards to provide techniques or mechanisms according to some implementations. For example, RNTI values in modified Table 7.1-1 (underlined text indicates modifications from current standards) of 3GPP TS 36.221 are provided below.

TABLE 7.1-1

RNTI values.

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFB | Reserved for future use |
| FFFC | RLF-RNTI |
| FFFD | M-RNTI |
| FFFE | P-RNTI |
| FFFF | SI-RNTI |

Note that the RLF-RNTI can be carried in a downlink shared channel (DL-SCH).

The measurement report sent by a UE as discussed above can be defined according to 3GPP TS 36.331 (as MeasurementReport), which can be modified as indicated by underlined text below.

MeasurementReport message

```
-- ASN1START
MeasurementReport ::=           SEQUENCE {
    critical-Extensions             CHOICE {
        c1                              CHOICE{
            measurementReport-r8            MeasurementReport-r8-IEs,
            spare7 NULL,
            spare6 NULL, spare5 NULL, spare4 NULL,
            spare3 NULL, spare2 NULL, spare1 NULL
        },
```

| MeasurementReport message |  |  |
|---|---|---|
| HandOver-Priority | BOOLEAN, | |
| criticalExtensionsFuture | SEQUENCE { } | |
| } | | |
| } | | |
| MeasurementReport-r8-IEs ::= | SEQUENCE { | |
| measResults | MeasResults, | |
| nonCriticalExtension | MeasurermentReport-v8a0-IEs | |
| OPTIONAL | | |
| } | | |
| MeasurementReport-v8a0-IEs ::= SEQUENCE { | | |
| lateNonCriticalExtension | OCTET STRING | OPTIONAL, |
| nonCriticalExtension | SEQUENCE { } | OPTIONAL |
| } | | |
| -- ASN1STOP | | |

| MeasurementReport descriptions |
|---|
| Handover-Priority |
| "1" means the handover of this UE shall be handled with priority. "0" means normal handover applies. |

Also, the RRC Connection Reconfiguration message as discussed above and as defined by 3GPP TS 36.331 can be modified as follows (indicated by underlined text).

The RRC Connection Reconfiguration message is the command to modify an RRC connection. The information element partialMobilityControlInfo is an example of the partial information included in the message sent at 612 in FIG. 6.

| RRCConnectionReconfiguration message |  |  |  |
|---|---|---|---|
| -- ASN1START | | | |
| RRCConnectionReconfiguration ::= | SEQUENCE { | | |
| rrc-TransactionIdentifier | RRC-TransactionIdentifier, | | |
| criticalExtensions | CHOICE { | | |
| c1 | CHOICE{ | | |
| rrcConnectionReconfiguration-r8 | RRCConneetionReconfiguration-r8-IEs, | | |
| spare7 NULL, | | | |
| spare6 NULL, spare5 NULL, spare4 NULL, | | | |
| spare3 NULL, spare2 NULL, spare1 NULL | | | |
| }, | | | |
| criticalExtensionsFuture | SEQUENCE { } | | |
| } | | | |
| } | | | |
| RRCConnectionReconfiguration-r8-IEs ::= SEQUENCE { | | | |
| measConfig | MeasConfig | OPTIONAL, | -- Need ON |
| mobilityControlInfo | MobilityControlInfo | OPTIONAL, | -- Cond HO |
| partialMobilityControlInfo | PartialMobilityControlInfo | OPTIONAL, | -- Cond HO |
| dedicatedInfoNASList | SEQUENCE (SIZE(1..maxDRB)) OF | | |
| | DedicatedInfoNAS | OPTIONAL, | -- Cond nonHO |
| radioResourceConfigDedicated | RadioResourceConfigDedicated | OPTIONAL, | -- Cond HO- toEUTRA |
| securityConfigHO | SecurityConfigHO | OPTIONAL, | -- Cond HO |
| nonCriticalExtension | RRCConnectionReconfiguration -v890-IEs | OPTIONAL | |
| } | | | |
| -- ASN1START | | | |
| PartialMobilityControlInfo ::= | SEQUENCE { | | |
| targetPhysCellId | PhysCellId, | | |
| carrierFreq | CarrierFreqEUTRA | OPTIONAL, | -- Cond HO- toEUTRA2 |
| carrierBandwidth | CarrierBandwidthEUTRA | OPTIONAL, | -- Cond HO- toEUTRA |
| additionalSpectrumEmission | AdditionalSpectrumEmission | OPTIONAL, | -- Cond HO- toEUTRA |
| subframeOffset | ENUMERATED { | | |
| | n1, n2, n3, n4, n5, n6, n7, n8,n9,n10}, | | |
| radioResourceConfigCommon | RadioResourceConfigCommon, | | |
| .... | | | |
| } | | | |
| CarrierBandwidthEUTRA ::= | SEQUENCE { | | |
| dl-Bandwidth | ENUMERATED { | | |
| | n6, n15, n25, n50, n75, n100,spare10, | | |
| | spare9, spare8, spare7, spare6, spare5, | | |
| | spare4, spare3, spare2 , spare1}, | | |

| RRCConnectionReconfiguration message | |
|---|---|
| ul-Bandwidth | ENUMERATED { <br> n6 , n15, n25, n50, n75, n100,spare10, <br> spare9, spare8, spare7, spare6, spare5, <br> spare4, spare3, spare2, spare1}OPTIONAL-- |

Need OP
}
CarrierFreqEUTRA ::=        SEQUENCE {
    dl-CarrierFreq          ARFCN-ValueEUTRA,
    ul-CarrierFreq          ARFCN-ValueEUTRA        OPTIONAL    -- Cond
FDD
}
CarrierFreqEUTRA-v9e0 ::=   SEQUENCE {
    dl-CarrierFreq-v9e0     ARFCN-ValueEUTRA-r9,
    ul-CarrierFreq-v9e0     ARFCN-ValueEUTRA-r9     OPTIONAL    -- Cond FDD
}
-- ASN1STOP

| PartiatlMobilityControlInfo descriptions |
|---|
| SubframeOffset <br> "n1" means the uplink grant in the target cell is allocated in the subframe 1. "n2" means the uplink grant in the target cell is allocated in the subframe 2. |

The following are the further example changes to various sections of TS 36.331 (as indicated by underlined text).

5.3.11.3 Detection of Radio Link Failure

The UE shall:

```
1> upon T310 expiry; or
1> upon random access problem indication from MAC while neither T300, T301, T304 nor
      T311 is running; or
1> upon indication from RLC that the maximum number of retransmissions has been
      reached:
   2> consider radio link failure to be detected;
   2> store the following radio link failure information in the VarRLF-Report by setting its fields as
         follows:
      3> clear the information included in VarRLF-Report, if any;
      3> set the plmn-Identity to the RPLMN;
      3> set the measResultLastServCell to include the RSRP and RSRQ, if available, of the PCell based
            on measurements collected up to the moment the UE detected radio link failure;
      3> set the measResultNeighCells to include the best measured cells, other than the PCell, ordered
            such that the best cell is listed first, and based on measurements collected up to the moment the
            UE detected radio link failure, and set its fields as follows:
         4> if the UE was configured to perform measurements for one or more EUTRA
               frequencies, include the measResultListEUTRA;
         4> if the UE was configured to perform measurement reporting for one or more
               neighbouring UTRA frequencies, include the measResultListUTRA;
         4> if the UE was configured to perform measurement reporting for one or more
               neighbouring GERAN frequencies, include the measResultListGERAN;
         4> if the UE was configured to perform measurement reporting for one or more
               neighbouring CDMA2000 frequencies, include the measResultsCDMA2000;
   NOTE:      The measured quantities are filtered by the L3 filter as configured in the mobility measurement
              configuration. The measurements are based on the time domain measurement resource restriction,
              if configured. Blacklisted cells are not required to be reported.
      3> if detailed location information is available, set the content of the locationInfo as follows:
         4> include the locationCoordinates;
         4> include the horizontalVelocity, if available;
      3> set the failedPCellId to the global cell identity, if available, and otherwise to the physical cell
            identity and carrier frequency of the PCell where radio link failure is detected;
      3> if an RRCConnectionReconfiguration message including the mobilityControlInfo concerning an
            intra E-UTRA handover was received before the connection failure:
         4> include previousPCellId and set it to the global cell identity of the PCell where the
               last RRCConnectionReconfiguration including the mobilityControlInfo message
               was received;
         4> set the timeConnFailure to the elapsed time since reception of the last
               RRCConnectionReconfiguration message including the mobilityControlInfo;
      3>if an RRCConnectionReconfiguration message includingthe
            partialMobilityControlInfo concerning an intra E-UTRA handover wasreceived
            before the connection failure:
         4>include previousPCellId and set it to the global cell identityofthePCellwherethe
               last RRCConnectionReconfiguration including the mobilityControlInfomessage
               was received:
```

```
        4>set the timeConnFailure to the elapsed time since receptionofthelast
            RRCConnectionReconfiguration message including the mobilityControlInfo;
        4>set the subframeOffset to the subframeOffset receivedinthe
            partialMobilityControlInfo.
    3> set the connectionFailureType to rlf;
  2> if AS security has not been activated:
    3> perform the actions upon leaving RRC_CONNECTED as specified in 5.3.12, with release cause
        'other';
  2> else:
    3> initiate the connection re-establishment procedure as specified in 5.3.7;
```

The UE may discard the radio link failure information, i.e. release the UE variable VarRLF-Report 48, hours after the radio link failure is detected, upon power off or upon detach.

The following describes changes to the RRC connection re-establishment procedure as provided by 3GPP TS 36.331 (indicated by underlined text).

5.3.7.2 Initiation

The UE shall only initiate the procedure when AS security has been activated. The UE initiates the procedure when one of the following conditions is met:

1>upon detecting radio link failure, in accordance with 5.3.11; or

1>upon handover failure, in accordance with 5.3.5.6; or

1>upon mobility from E-UTRA failure, in accordance with 5.4.3.5; or

1>upon integrity check failure indication from lower layers; or

1>upon an RRC connection reconfiguration failure, in accordance with 5.3.5.5;

Upon initiation of the procedure, the UE shall:

```
    1> stop timer T310, if running;
    1> start timer T311;
    1> suspend all RBs except SRB0;
    1> reset MAC;
    1> release the SCell(s), if configured, in accordance with 5.3.10.3a;
    1> apply the default physical channel configuration as specified in 9.2.4;
    1> apply the default semi-persistent scheduling configuration as specified in 9.2.3;
    1> apply the default MAC main configuration as specified in 9.2.2;
    1> release reportProximityConfig and clear any associated proximity status reporting timer;
    1> release measSubframePatternPCell, if configured;
    1> if connected as an RN and configured with an RN subframe configuration:
        2> release the RN subframe configuration;
    1> perform cell selection in accordance with the cell selection process as specified in TS
        36.304 [4];
    2> if an RRCConnectionReconfiguration message including the partialMobilityControlInfo
        concerning an intra E-UTRA handover was received before theconnectionfailure:
        2>if the carrierFreq is included:
            3>consider the target PCell to be one on the frequency indicated by thecarrierFreqwithaphysical
                cell identity indicated by the targetPhysCellId;
        2>else:
            3>consider the target PCell to be one on the frequency of the sourcePCellwithaphysicalcell
                identity indicated by the targetPhysCellId;
    2>Apply the radioResourceConfigCommon received in the partialMobilityControlInfo,
    2>reset TAT timer;
    Note: in this case, the UE assumes UL synchronizationwithtargetPCell.
    2>start synchronising to the DL of thetargetPCell.
    Note: After DL synchronization, the UE searches for UL grants inthetargetPCellinthe
        subframe(s) indicated by subframeOffset.
```

5.3.7.4 Actions Related to Transmission of RRCConnectionReestablishmentRequest Message If the procedure was initiated due to radio link failure or handover failure, the UE shall:

---

1> if an RRCConnectionReconfiguration message includingthe partialMobitityControlInfo concerning an intra E-UTRA handover was received before the connectionfailure
    2> set the reestablishmentCellId to the targetPhysCellIdinthe partialMobilityControlInfo.
1> else
    2> set the reestablishmentCellId in the VarRLF-Report to the global cell identity of the selected cell;

---

The UE shall set the contents of RRCConnectionReestablishmentRequest message as follows:

---

1> set the ue-Identity as follows:
    2> set the c-RNTI to the C-RNTI used in the source PCell (handover and mobility from E-UTRA failure) or used in the PCell in which the trigger for the re-establishment occurred (other cases);
    2>if an RRCConnectionReconfiguration message including the partialMobilityControlInfoconcerning an intra E-UTRA handover was received before the connectionfailure
        3>set the physCellId to the targetPhysCellId in the partialMobilityControlInfo;
    2>else
        3>set the physCellId to the physical cell identity of the source PCell (handover and mobility from E-UTRA failure) or of the PCell in which the trigger for the re-establishment occurred (other cases);
    2> set the shortMAC-I to the 16 least significant bits of the MAC-I calculated:
        3> over the ASN.1 encoded as per section 8 (i.e., a multiple of 8 bits) VarShortMAC-Input;
        3> with the $K_{RRCint}$ key and integrity protection algorithm that was used in the source PCell (handover and mobility from E-UTRA failure) or of the PCell in which the trigger for the re-establishment occurred (other cases); and
        3> with all input bits for COUNT, BEARER and DIRECTION set to binary ones;
1> set the reestablishmentCause as follows:
    2> if the re-establishment procedure was initiated due to reconfiguration failure as specified in 5.3.5.5 (the UE is unable to comply with the reconfiguration):
        3> set the reestablishmentCause to the value reconfigurationFailure;
    2> else if the re-establishment procedure was initiated due to handover failure as specified in 5.3.5.6 (intra-LTE handover failure) or 5.4.3.5 (inter-RAT mobility from EUTRA failure):
        3> set the reestablishmentCause to the value handoverFailure;
    2> else:
        3> set the reestablishmentCause to the value otherFailure;

---

The UE shall submit the RRCConnectionReestablishmentRequest message to lower layers for transmission.

The following are the further example changes to TS 36.321 (as indicated by underlined text).

5.3 DL-SCH Data Transfer

5.3.1 DL Assignment Reception

Downlink assignments transmitted on the PDCCH indicate if there is a transmission on a DL-SCH for a particular UE and provide the relevant HARQ information.

When the UE has a C-RNTI, Semi-Persistent Scheduling C-RNTI, RLF-RNTI, or Temporary C-RNTI, the UE shall for each TTI during which it monitors PDCCH and for each Serving Cell:

if a downlink assignment for this TTI and this Serving Cell has been received on the PDCCH for the UE's C-RNTI, or Temporary C-RNTI:
    if this is the first downlink assignment for this Temporary C-RNTI:
      consider the NDI to have been toggled.
    if a downlink grant for this TTI has been received on the PDCCH for the RLF-RNTI,
      if the downlink assignment is for UE's C-RNTI and if the previous downlink assignment indicated to the HARQ entity of the same HARQ process was either a downlink assignment received for the UE's Semi-Persistent Scheduling C-RNTI or a configured downlink assignment:
        consider the NDI to have been toggled regardless of the value of the NDI.
    indicate the presence of a downlink assignment and deliver the associated HARQ information to the HARQ entity for this TTI.
  else, if this Serving Cell is the PCell and a downlink assignment for this TTI has been received for the PCell on the PDCCH of the PCell for the UE's Semi-Persistent Scheduling C-RNTI:
    if the NDI in the received HARQ information is 1:
      consider the NDI not to have been toggled;
      indicate the presence of a downlink assignment and deliver the associated HARQ information to the HARQ entity for this TTI.
    else, if the NDI in the received HARQ information is 0:
      if PDCCH contents indicate SPS release:
        clear the configured downlink assignment (if any);
        if timeAlignmentTimer is running:
          indicate a positive acknowledgement for the downlink SPS release to the physical layer.
      else:
        store the downlink assignment and the associated HARQ information as configured downlink assignment;
        initialise (if not active) or re-initialise (if already active) the configured downlink assignment to start in this TTI and to recur according to rules in subclause 5.10.1;
        set the HARQ Process ID to the HARQ Process ID associated with this TTI;
        consider the NDI bit to have been toggled;
        indicate the presence of a configured downlink assignment and deliver the stored HARQ information to the HARQ entity for this TTI.
  else, if this Serving Cell is the PCell and a downlink assignment for this TTI has been configured for the PCell and there is no measurement gap in this TTI; and
  if this TTI is not an MBSFN subframe of the PCell or the UE is configured with transmission mode tm9 on the PCell:
    instruct the physical layer to receive, in this TTI, transport block on the DL-SCH according to the configured downlink assignment and to deliver it to the HARQ entity;

set the HARQ Process ID to the HARQ Process ID associated with this TTI;

consider the NDI bit to have been toggled;

indicate the presence of a configured downlink assignment and deliver the stored HARQ information to the HARQ entity for this TTI.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    receiving, by a user equipment (UE), a message identifying a subframe containing information relating to an uplink grant to be sent by a target cell; and
    detecting, by the UE, the uplink grant in the identified subframe transmitted by a target wireless access network node of the target cell, wherein the detecting is based on detecting a radio link failure (RLF)-radio network temporary identity (RNTI) in the subframe.

2. The method of claim 1, wherein the message is received by the UE from a wireless access network node of a source cell.

3. The method of claim 1, further comprising sending, by the UE in response to the UE successfully accessing the target cell or detecting the information relating to the uplink grant, a message to the target cell to handover from a source cell to the target cell.

4. The method of claim 3, wherein the message received by the UE is a Radio Resource Control (RRC) Reconfiguration message, and the message sent to the target cell is an RRC Reestablishment message.

5. The method of claim 1, wherein the subframe includes a control region and a data region, and wherein the uplink grant is in the data region of the subframe.

6. A method comprising:
    receiving, by a user equipment (UE), a message identifying a subframe containing information relating to plural uplink grants for the UE to be sent by a target cell, wherein the subframe includes a control region and a data region, and wherein the plural uplink grants for the UE are in the data region of the subframe;
    receiving, by the UE, the subframe that includes the control region and the data region;
    detecting, by the UE, a predefined indicator in the control region; and
    detecting, by the UE, an uplink grant of the uplink grants in the data region of the subframe based on detecting the predefined indicator.

7. The method of claim 6, wherein a temporary identifier is associated with each of the plural uplink grants, wherein the temporary identifier associated with the detected uplink grant includes a cell-RNTI (C-RNTI) of the UE.

8. The method of claim 1, wherein the message identifies plural subframes, the method further comprising detecting, by the UE, uplink grants in the identified subframes transmitted by the target wireless access network node of the target cell.

9. The method of claim 1, further comprising sending, by the UE to a wireless access network node, a handoff priority indication, wherein the received message is responsive to receipt of the handoff priority indication by the wireless access network node.

10. The method of claim 9, wherein sending the handoff priority indication is responsive to the UE determining that one or more criteria are satisfied, the one or more criteria comprising a speed of the UE exceeding a threshold.

11. A method comprising:
    receiving, by a source wireless access network node from a user equipment (UE), a handoff priority indication that indicates that the UE is to be given handover priority for radio connection re-establishment due to radio link failure (RLF) during a handover;
    in response to deciding that the UE is to be handed over to a target cell, sending, by the source wireless access network node, a handover request message to the target cell;
    performing, by the source wireless access network node based on the received handoff priority indication, a determination that the UE is to be given priority in case of the radio connection re-establishment; and
    in response to the determination that the UE is to be given priority in case of the radio connection re-establishment, sending, by the source wireless access network node to the UE, a message identifying a subframe containing information relating to a plurality of uplink grants for the UE to be sent by the target cell.

12. The method of claim 11, wherein the message is a radio resource control (RRC) reconfiguration message.

13. A target wireless access network node comprising:
    at least one processor configured to:
        receive, from a source wireless access network node, a handover request for handing over a user equipment (UE) from the source wireless access network node to the target wireless access network node;
        detect that the UE has not successfully handed over to the target wireless access network node due to a radio link failure (RLF);
        in response to the detecting, send an uplink grant to the UE in a subframe previously identified to the UE by the source wireless access network node; and
        perform a handover, responsive to the handover request, of the UE to the target wireless access network node based on use by the UE of an uplink resource identified by the uplink grant, the handover performed after the RLF without performing a random access procedure with the UE.

14. The target wireless access network node of claim 13, wherein the at least one processor is configured to further:
    receive a request from the source wireless access network node an identification of the subframe to use for sending the uplink grant.

15. The target wireless access network node of claim 13, wherein the at least one processor is configured to further:
    receive a message in a resource specified by the uplink grant, the received message to confirm the handover.

16. The target wireless access network node of claim 13, wherein the at least one processor is configured to further:
    in response to the detecting, send another uplink grant to the UE in another subframe previously identified to the UE by the source wireless access network node.

17. A user equipment (UE) comprising:
    at least one processor configured to:
        receive, from a source cell, a message identifying a subframe containing information relating to an uplink grant to be sent by a target cell;
        receive the subframe that includes a control region and a data region;

detect a predefined indicator in the control region; and
detect the uplink grant in the data region of the subframe based on detecting the predefined indicator.

18. The target wireless access network node of claim 13, wherein the subframe includes an RLF-radio network temporary identity (RNTI) useable by the UE to detect the uplink grant in the subframe.

19. The UE of claim 17, wherein the predefined indicator is a radio link failure (RLF)-radio network temporary identity (RNTI).

20. The UE of claim 17, wherein the at least one processor is configured to use the uplink grant to perform a handover procedure to handover the UE from the source cell to the target cell, without performing a random access procedure with the target cell.

21. The method of claim 6, wherein the predefined indicator is a radio link failure (RLF)-radio network temporary identity (RNTI).

* * * * *